July 21, 1970  J. M. SCHNEIDER  3,520,962
METHOD AND APPARATUS FOR THE FORMATION OF DEEP DRAWN
BODIES FROM PLASTICS MATERIAL
Filed Oct. 22, 1965  8 Sheets-Sheet 3
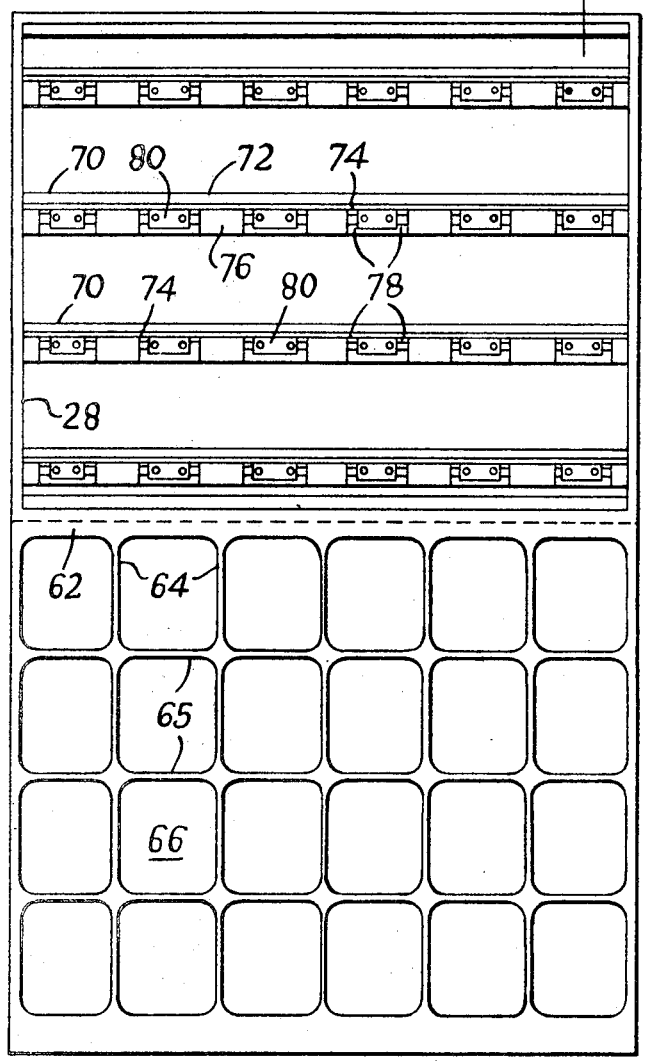
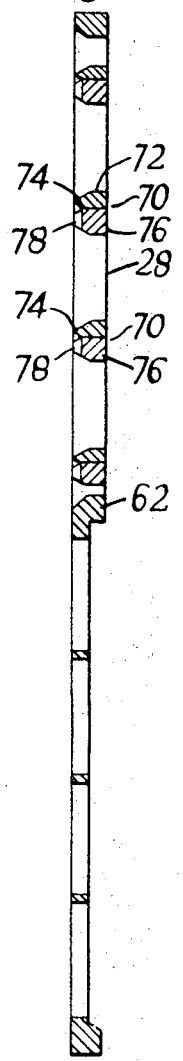
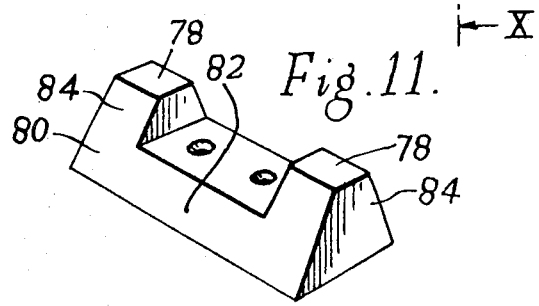

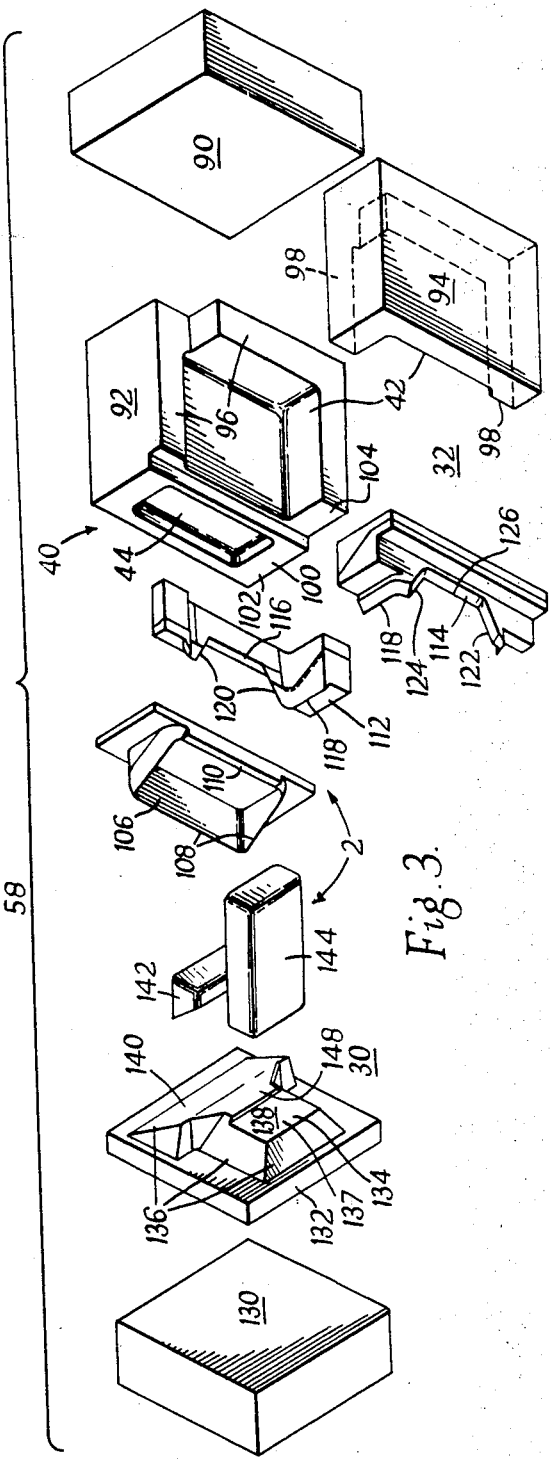

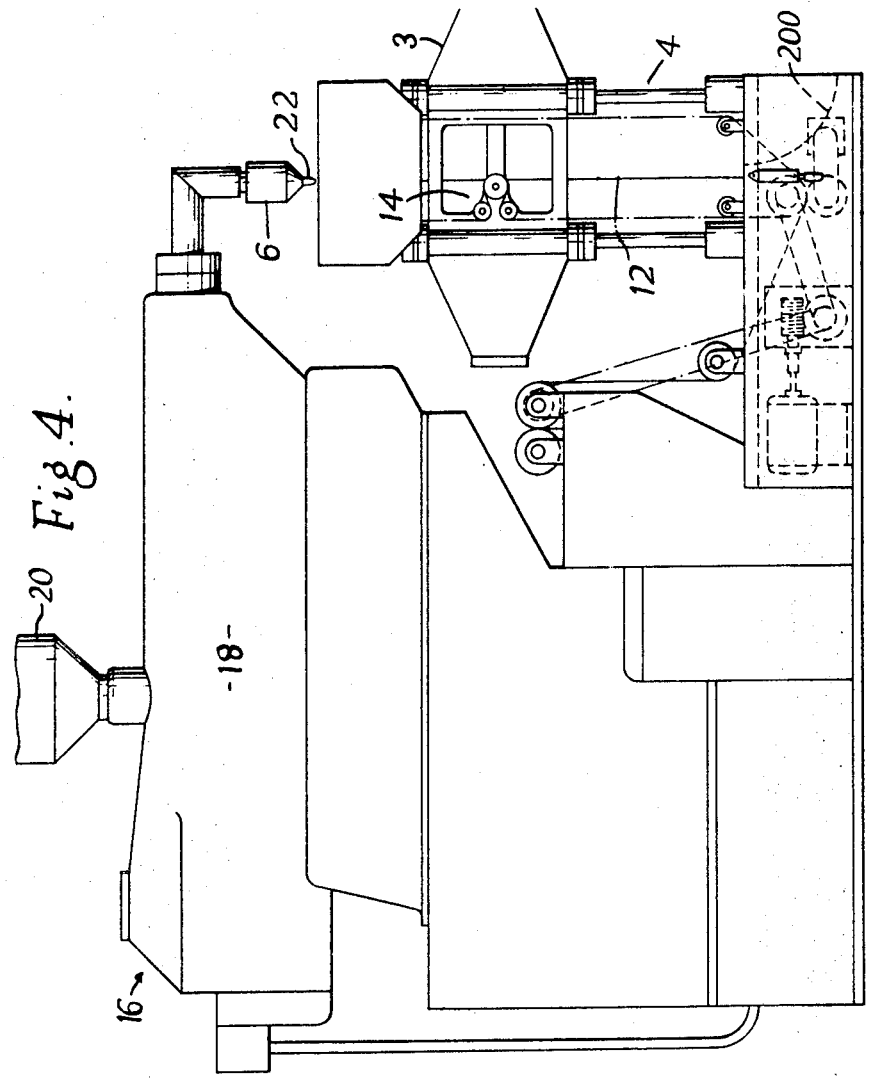

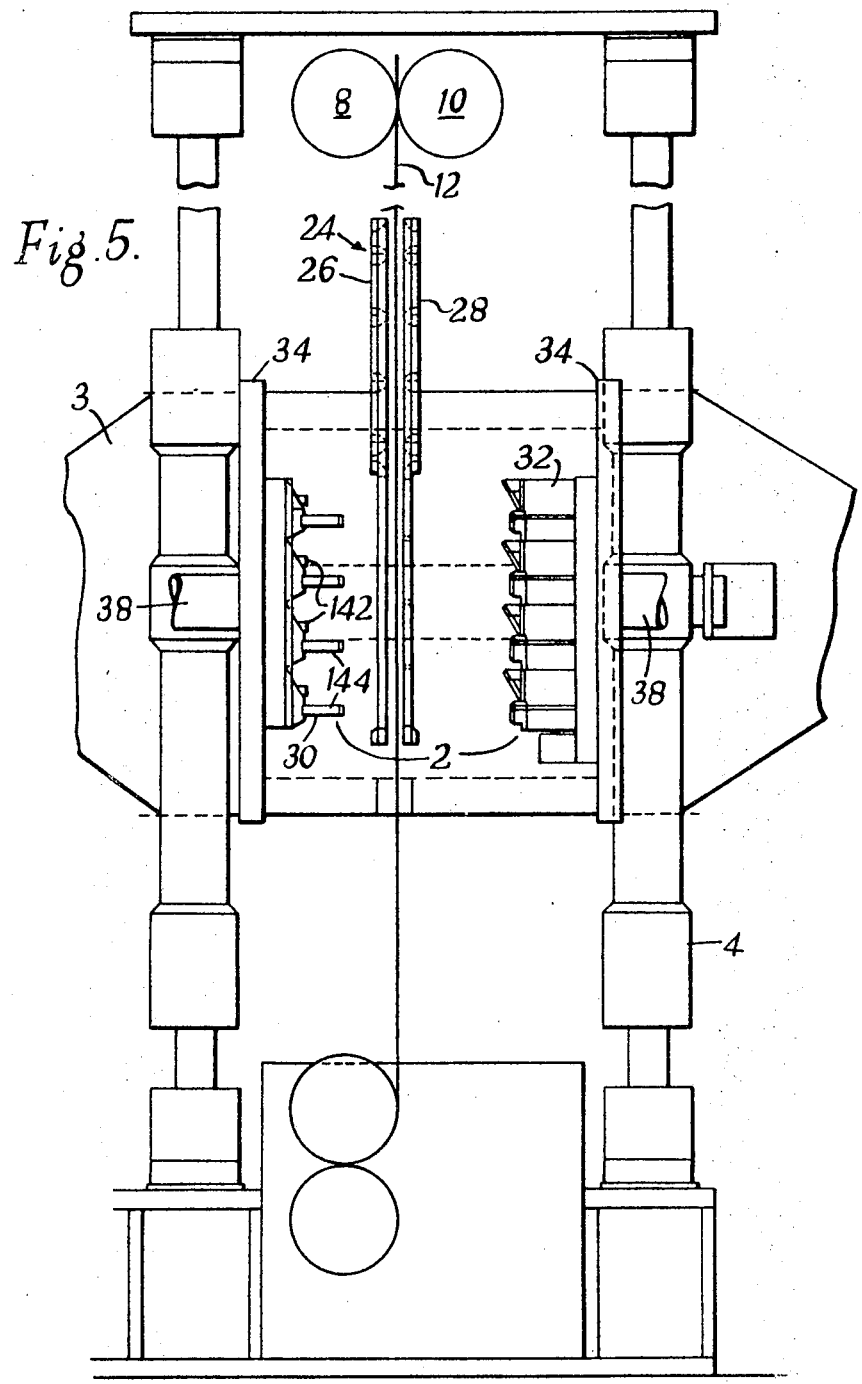

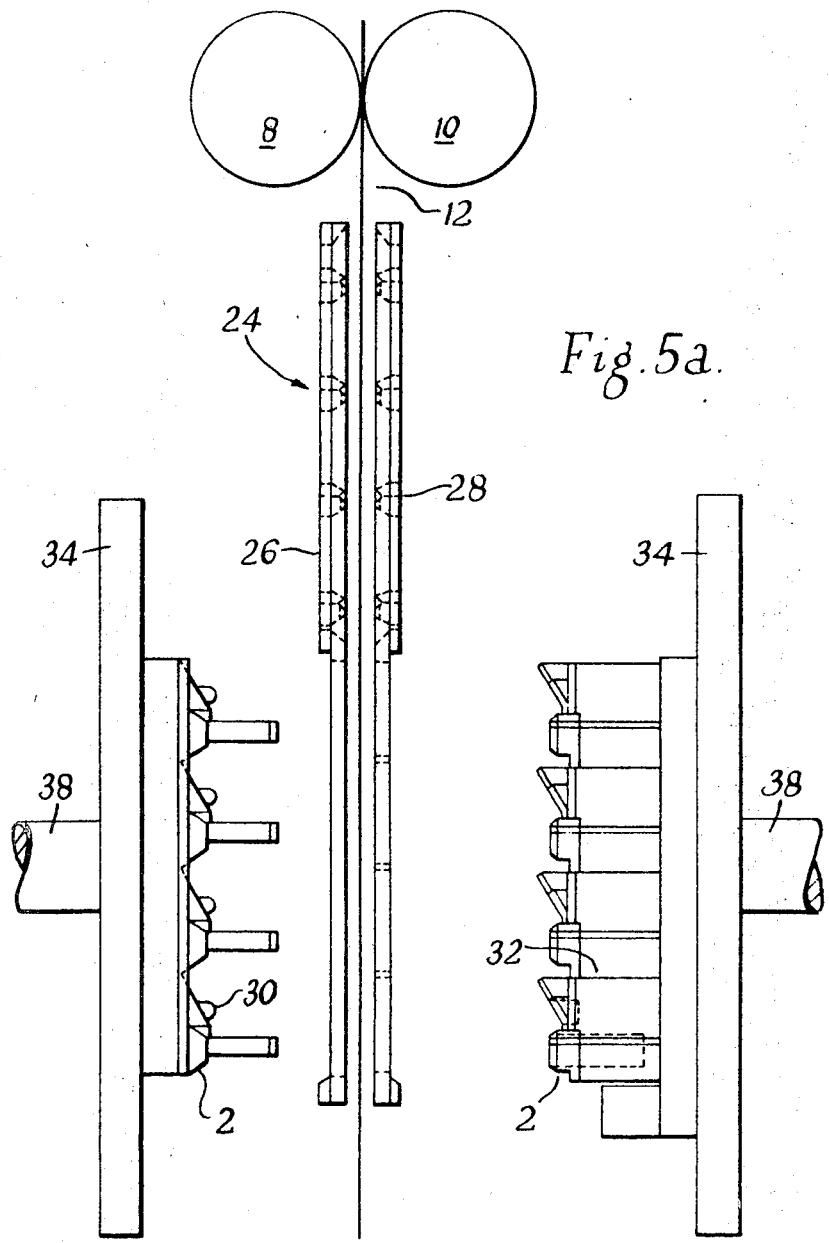

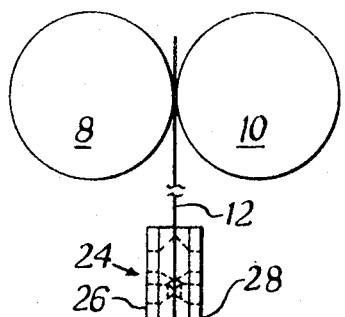
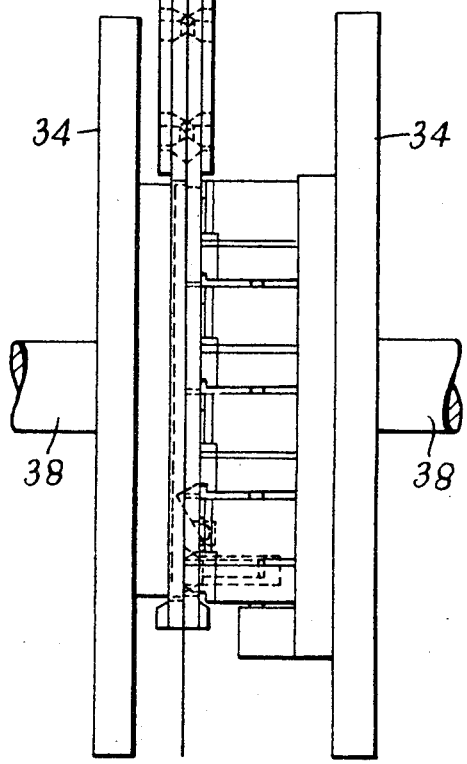
Fig.5c.

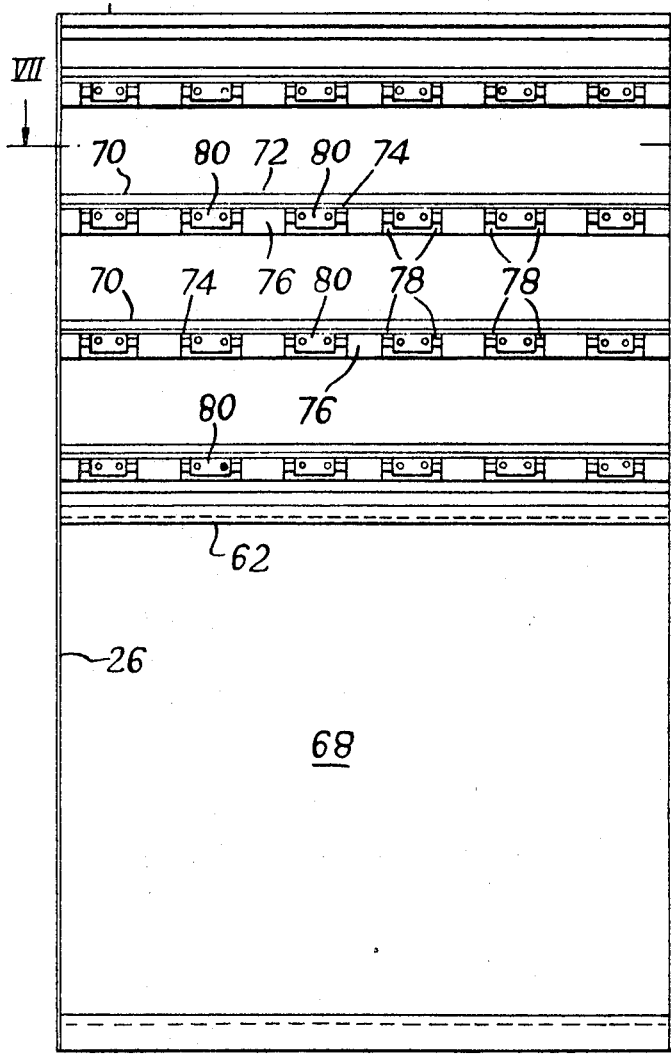
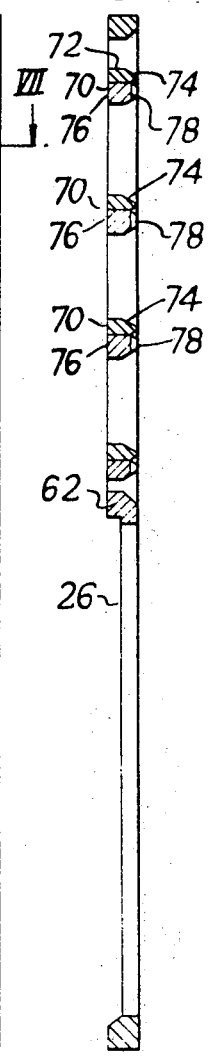

United States Patent Office 3,520,962
Patented July 21, 1970

3,520,962
METHOD AND APPARATUS FOR THE FORMATION OF DEEP DRAWN BODIES FROM PLASTICS MATERIAL
Jack M. Schneider, Furze Hill, Kingswood, England, assignor to Calmec Extruform Limited, London, England, a British company
Filed Oct. 22, 1965, Ser. No. 502,153
Int. Cl. B29c 17/03, 17/04
U.S. Cl. 264—89    13 Claims

ABSTRACT OF THE DISCLOSURE

A sheet of plastic initially has selected portions cooled to control the distribution of the sheet plastic material during the subsequent forming steps. After cooling, the plastic sheet is clamped between a first frame component which engages a closed area only at its periphery and a second frame component having an array of apertures. Male tools then displace discrete sections of the clamped area of the sheet through each of the apertures in the second frame component whereby discrete sections of the sheet are moved into engagement with the corresponding male tool. The plastic sections are then transferred to a corresponding female tool so that hollow bodies of substantially uniform thickness are formed.

---

Preferably, the method according to the invention includes effecting cooling at predetermined locations of the sheet which on transfer of the sheet to the female tool element means are disposed in the neighbourhood each of a corner of a deep drawn body formed in the sheet.

Advantageously, the method according to the invention also includes during a first forming operation on a section of a continuous heated sheet of plastics material, effecting cooling at predetermined locations of a section of the sheet on which a second forming operation is to be performed in sequence after the first forming operation. Desirably, cooling is effected at further predetermined locations and prior to engagement of the male in the female tool element means a suction is applied at the side of the sheet engaged by the male tool element means whereby the sheet is made to conform with the male tool element means, the further cooled locations of the sheet inhibiting the formation of undesired folds in the sheet as the sheet is made to conform to the male tool element means.

Where the formed body is a container having a hollow body and a hinged top closure for the body, the method, according to the invention, further includes locally cooling a linear portion of the sheet located between projecting plugs of the male tool element to which the sheet is made to conform before transfer to cavities in the female tool element corresponding respectively with the body and top of the container, the cooled linear portion of the sheet serving to inhibit the formation of undesired folds in the sheet between the projecting plugs as the sheet is made to conform to the male tool element means.

The invention also includes apparatus for carrying out the method set forth above comprising a carriage, a supporting structure on which the carriage is mounted and which when disposed close to the outlet of an extrusion apparatus provides a path for the downward passage of heated sheet plastics material from the extrusion apparatus and along which the carriage is reciprocable towards and away from the said outlet, frame components mounted on the carriage on opposite sides of the path of heated sheet plastics material, means for effecting relative movement of the frame components towards and away from a position in which the frame components can secure therebetween a section of the heated sheet plastics material, male and female tool element means supported on the carriage on opposite sides of the path of heated sheet plastics material, means for relatively moving the male and female tool element means towards and away from a position within the boundary of the frame components of engagement of the male in the female tool element means, means for effecting local cooling of the heated sheet plastics material at locations on the sheet in advance in the direction of sheet travel of the male and female tool element means, and means for moving the carriage downwardly along the path of heated sheet plastics material at a rate sensibly equal to the rate of supply of material from the extrusion apparatus and for rapidly returning the carriage along the path to an uppermost position thereof.

The invention will now be described, by way of example, with reference to the accompanying drawings, in which:

FIGS. 1 and 2 are perspective views of a so-called flip-top, anti-crush cigarette packet;

FIG. 3 is an exploded perspective view of a tool element for forming the packet shown in FIGS. 1 and 2;

FIG. 4 is a general arrangement view showing in side elevation the apparatus for forming deep-drawn hollow bodies in accordance with this invention;

Figure 5B:
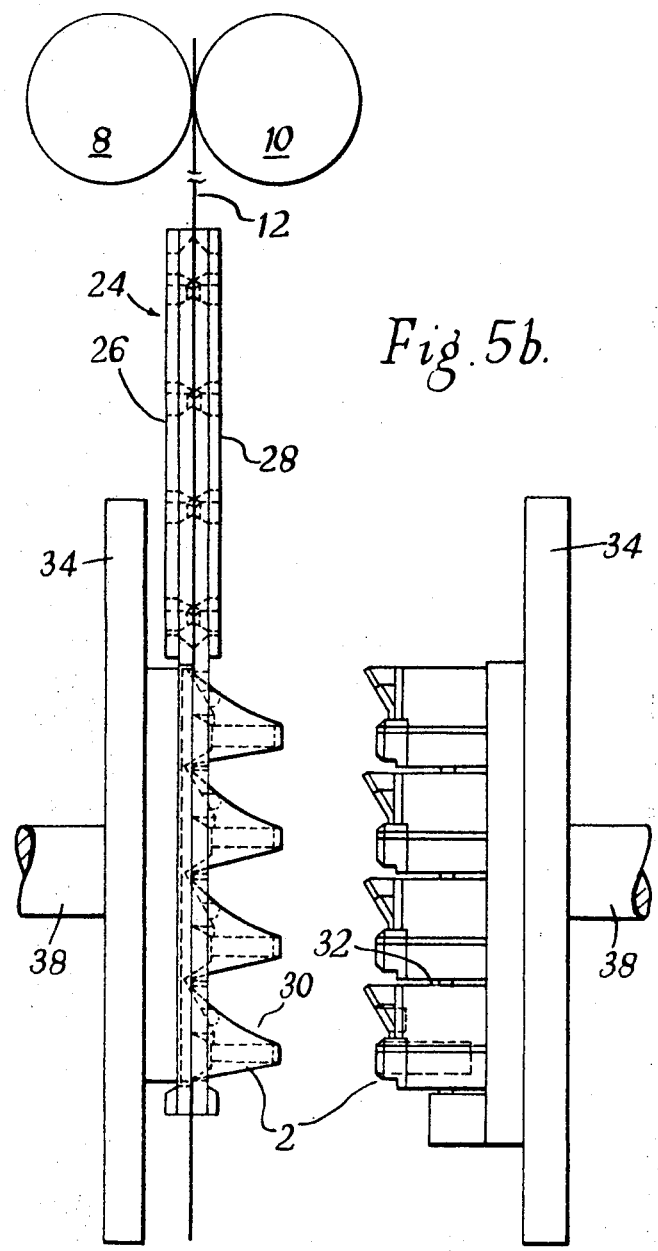

FIG. 5 and FIG. 5a to c show in side elevation peripheral parts of the apparatus of FIG. 4 at different stages during a forming operation;

FIG. 6 is a front elevation of one of a pair of frame components in which the plastics sheet material is secured during each forming operation;

FIG. 7 is a plan view on the line VII—VII of the frame component of FIG. 6;

FIG. 8 is a view of the component of FIG. 6 taken on the line VIII—VIII of that figure;

FIG. 9 is a front elevation of the other of the pair of frame components in which the plastics sheet material is secured during each forming operation;

FIG. 10 is a view taken on the line X—X of FIG. 9; and

FIG. 11 illustrates a detail of the construction of the frame components of FIGS. 6 and 9.

Referring to the drawings, in which like parts have been accorded the same reference numerals throughout, the method of forming deep drawn hollow bodies from plastics material is applied to so-called flip-top anti-crush cigarette packets and is performed on apparatus of the kind described in co-pending patent application No. 448,759, now Patent No. 3,271,816. The apparatus described therein broadly comprises tool means 2 on a carriage 3 reciprocably mounted on an elongated supporting structure 4 which, when disposed close to the outlet of an extrusion apparatus 6, provides a path along which the tool means 2 can be reciprocated towards and away from the said outlet, driving rollers 8 and 10 for controlling the thickness of and for driving sheet plastics material emerging from the said outlet along a path 12 provided by the supporting structure 4, hydraulically operated means on the carriage for causing the tool means to engage and thereby effect a forming operation on a section of heated sheet material, means generally indicated at 14 for advancing the engaged tool means along the said path in a direction away from the outlet and at a rate sensibly equal to the rate of supply of material therefrom, and means on the carriage for releasing the tool means from the section after travel through a predetermined distance, whereby the section retains its formed shape, and for rapidly returning the tool means along the path to their initial position for engagement with a succeeding section of material.

More specifically, the apparatus includes a conventional extruding apparatus 16 having a heating chamber 18, a hopper 20 for the supply of powdered plastics material to an inlet of the heating chamber, and a screw (not shown) for conveying heated material from the chamber and forcing the material through an extruding die at the outlet 22 of the apparatus to form a sheet. This outlet is disposed in an upper part of the extruding apparatus with the extruding die so arranged that the extruded sheet material moves vertically downwardly therefrom along the path 12. The apparatus operates on successive sections of the heated sheet plastics material as the sheet emerges from the extrusion apparatus. To this end there is provided a frame 24 comprising two similar rectangular shaped components 26 and 28 disposed respectively on opposite sides of the path of the heated sheet plastics material through the apparatus. The components 26 and 28 of the frame 24 are mounted at their corners on respective piston rods of pneumatically operated rams (not shown) having cylinders supported on side plates of the carriage 3 and are therefore reciprocable lengthwise of the apparatus with the carriage 3 as is described in co-pending application No. 448,759, now Pat. No. 3,271,816. The frame components 26 and 28 are also movable by their associated pneumatic rams transversely of the sheet between an inner position in which the frame components are in register and clamp a section of the heated sheet all around the periphery of the section and an outer position in which the frame components are spaced a short distance from the sheet on opposite sides thereof.

The tool means 2 which are carried on the vertically movable carriage 3 comprise male and corresponding female tool element means respectively 30 and 32 disposed on opposite sides respectively of the path 12 of the heated sheet plastics material through the apparatus. The male and female tool element means 30 and 32 each comprise twenty-four sets of elements arranged in four horizontal rows one above the other, and occupying an area of width substantially equal to the width of the frame components 26 and 28 and height equal to substantially half the vertical height of the frame components. Each tool element means 30 and 32 comprises an assembly of parts carried on a vertically disposed platen 34 which is itself mounted on the piston rod 38 of an hydraulic ram which is horizontally disposed and the cylinder of which is secured to the carriage 3. Each female tool element 40 of the female tool element means 32 is formed with interior cavities 42 and 44 extending forwardly from the rear of the element which respectively define the shape of the body 46 and the top 48 of the flip-top anti-crush cigarette packet. As seen in FIGS. 1 and 2, this well known form of cigarette packet has a body 46 of overall depth somewhat greater than the longer side of the rectangular cross-section of the body. Also at the front and sides of the packet the body 46 is rebated at 50 to receive the flip-top 48 which is hinged by hinge 52 to the free edge of the rear of the body 46. The edges 54 of the rebated portions of the respective sides of the body extend, as seen in FIG. 2, upwardly and rearwardly from the lower edge 56 of the rebated portion of the front of the body. The edges 56 and 54 of the rebated portions at the front and sides of the body part engage, in the closed position of the flip-top of the packet, complementarily shaped edges 58 and 60 on the front and sides of the flip top.

Each of the frame components 26 and 28 is formed with a horizontal cross piece 62 at the mid point of the vertical height thereof and is thereby divided into upper and lower rectangular frame members. The lower rectangular frame member of the frame component 28 on the side of the path of the heated sheet remote from the male tool element means is further subdivided by vertical and horizontal elements 64 and 65 to afford an array of twenty-four rectangular apertures 66 arranged in four rows one above the other. When the male tool element means 30 are, as hereinafter more fully described, moved laterally into engagement with the heated sheet, each male tool element projects through one of the apertures in the lower frame member 28 on the side of the path 12 remote from the male tool element means.

The lower rectangular frame member of the frame component 26 on the side of the sheet adjacent the male tool element means consists of a single aperture 68 defined by the central cross piece 62 and bottom cross member and the lower halves of the upright sides of the frame component 26.

The upper rectangular frame member of each frame component is similarly formed and includes four horizontally disposed vertically spaced groups 70 of bars. The groups 70 of bars of one upper frame member are disposed face to face with the groups 70 of bars of the other frame member with the path 12 of the heated sheet extending vertically therebetween.

Each group 70 of bars includes an upper bar 72 which presents a tapered edge 74 thereof towards the path of the heated sheet and a lower bar 76 which presents to the path of the heated sheet a series of six pairs 78 of rectangular flat pads. As seen in FIG. 11, each pair of pads 78 is provided by a U-shaped member 80 the bight 82 of which is screwed to the bar 76 whilst the legs 84 of the member 80 taper in a direction away from the bight 82 to provide, at their extremities remote from the bight 82, the rectangular pads 78.

When the frame components 26 and 28 are engaged with the sheet the groups 70 of bars contact the sheet along the edges 74 and at the surfaces of the pads 78 and effect local cooling of the sheet and therefore an increase in rigidity where the sheet is cooled. After a forming operation on the sheet by the male and female tool element means 30 and 32, the latter and the frame components 26 and 28 are retracted from the sheet and in a subsequent forming operation are re-engaged with the sheet so that the part of the sheet which in the initial forming operation was disposed between and locally cooled by the bar groups 70 of the upper frame member is, in the re-engaged position, clamped by the lower frame members and, in this position, the part of the sheet which occupies each of the twenty-four apertures 66 in the lower frame member 28 on the side of the sheet remote from the male tool element means 30 includes three locally cooled parts, namely, a horizontal linear locally cooled part and therebelow two horizontally spaced, locally cooled small rectangular areas. The presence of the horizontal linear locally cooled part helps, as hereinafter described, in the forming of the sheet without folds to each element of the male tool element means whilst the locally cooled small rectangular areas help to ensure that the wall thickness of the sheet when transferred from the male to the female tool elements is substantially uniform in thickness.

It should be noted that the surfaces of the members 80 and the bars of the bar groups 70 facing the sheet are covered with material such as Teflon to prevent the sheet sticking to the bar groups.

Each female tool element 40 of the female tool element means 32 is disposed at the forward side of the apparatus and includes a forward member 90 of rectangular section which is secured by bolts to the rear face of the vertically disposed horizontally reciprocable platen 34, movement of the platen being effected, as described above, by a hydraulic ram. On a rear face of the forward member are disposed two complementary parts 92 and 94, part 92 of which is secured as by bolts (not shown) to the forward member 90 whilst the part 94 is secured to the piston rod of a pneumatic ram (not shown) which is vertically disposed and the cylinder of which is mounted on the rear face of the vertically disposed platen 34 to which is secured the forward member 90 of the female tool element. Actuation of the pneumatic ram effects, as the case may be, slight separation or bringing together of the two complementary parts 92 and 94 and of the parts hereinafter described secured to each of these complementary parts. The separation of the complementary parts 92 and 94 takes place at faces 96 and 98 of the respective parts which extend in the front to rear direction, i.e. lengthwise of the female tool element, and the need to effect separation arises from the fact that the female tool element is undercut to form the rebated portions 50 of the packet and, therefore, separation is desirable, though not essential, to facilitate ejection of the formed packet from the female tool element.

In the engaged position of the two complementary parts they provide a rear vertically disposed stepped surface 100. In the rearward flat portion 102 of this stepped surface is formed the forwardly extending cavity 44 and in the forward flat portion 104 is formed the cavity 42. These cavities correspond with the parts of the body and flip top of the packet remote from the mouths thereof. Part of the cavity 42 corresponding with the body of the packet is formed in one of the two complementary parts and the remainder of the cavity is formed in the other of the two complementary parts.

On the flat part 102 of the stepped surface 100 in which is formed the cavity 44 corresponding with part of the flip top of the packet is mounted a member 106 which defines the shape of the mouth portion of the flip top and to this end includes knife edges 108 on three sides thereof and a flat portion 110 on the fourth side which portion defines part of the hinge 52 connecting the flip top and body of the packet.

On the flat portion 104 of the rear stepped surface 100 of the two complementary parts 92 and 94 in which is formed the cavity 42 corresponding with the portion remote from the mouth of the body 46 of the packet are mounted two sets of parts 112 and 114 which together define the mouth portion of the body 46 of the packet. The set 112 of parts is secured to part 92 and the set 114 to the part 94, and each of the sets of parts is undercut on its interior surface to provide the rebated part 50 of the body portion of the packet on which is engaged the flip top 48.

The set 112 of parts secured to the part 92 in which is formed the cavity 44 corresponding with the flip top includes at its rear surface a flat portion 116 which is co-extensive with the flat portion 110 of the member defining the mouth of the flip top. These co-extensive flat portions together define the hinge by which the flip top and the body portions of the packet are connected.

In addition to defining the hinge, the two sets of parts 112 and 114 at their rearmost edges are formed with knife edges which together define the mouth of the body portion of the packet. To this end, at the sides of the body portion knife edges 118 are transverse to the depth of the body portion. At the sides of the body portion adjacent the flip top two oppositely inclined knife edges 120 each connect an end of the knife edge at a side of the body portion with an end of the flat portion 116 defining the hinge. At the remaining side of the body portion there are three knife edges 122, 124 and 126 of which two, namely 122 and 124, are oppositely inclined and each connects at one end with an end of one of the knife edges 118 at the side of the body portion and at the other end with an end of the knife edge 126 at said remaining side of the body portion of the packet, which extends transversely of the depth of the packet.

A number of ducts (not shown) are formed in the female tool element which lead to the interior of the cavities 44 and 42 corresponding with the flip top and body of the packet. Through these ducts air may be supplied to and extracted from the cavities respectively from a source of air under pressure and by a vacuum pump. The source of air and the vacuum pump are selectively connected to the ducts leading to the cavities 42 and 44 by way of a spool valve, the spool of which is moved from a neutral position to connect the source of air or the pump to the ducts upon actuation of respective microswitches which are operated at selected points in the downward travel of the carriage 3.

Each male tool element of the male tool element means 30 consists of an assembly in which is provided a rear part 130 of rectangular section which is mounted on the front surface of vertically disposed platen 34 which is horizontally reciprocable and for this purpose is carried on the piston rod of a horizontally disposed ram, the cylinder of which is secured to the carriage 3. The rear part 130 of each male tool element assembly incorporates an electrical cartridge-type heating element.

On the front surface of the rear part 130 of the male tool element assembly is mounted a member 132 which on its front surface is formed with a solid projection 134 which has sloping side surfaces 136 with which the knife edges 108 and 118 to 126 of the female tool element engage when the male tool element is fully inserted into the female tool element.

The solid projection 134 has a forwardly facing surface 139 a part 138 of which is flat and a part 140 of which is inclined. On the inclined part is carried a first plug 142 of rectangular section which, on movement of the male and female tool elements into engagement, is disposed in the flip top cavity 44 of the female tool element, whilst on the flat surface 138 is carried a second plug 144 of rectangular section which, in the engaged position of the male and female tool elements, is disposed within the cavity 42 of the female tool element corresponding with the body portion of the packet.

It should be noted that when the male tool elements are engaged with the sheet so that they project each through an aperture 66 of the lower frame member of the frame component 28 on the side of the sheet path 12 remote from the male tool elements, the horizontal linear locally cooled parts of the sheet which were cooled by the edges 74 in the immediately preceding forming operation extend each parallel with and between the first and second plugs 142 and 144 of the associated male tool element.

The cavities in each female tool element are of substantially greater dimensions than the first and second plugs on each male element and in the engaged position of the elements the plugs are each disposed so that the sides thereof are approximately equally spaced from the corresponding cavity side walls.

As with the female tool element, ducts are formed in each plug 142 and 144 of the male element whereby air can be supplied to or extracted from the interior of a plastic hollow body on the male tool element. To this end, a source of air under pressure and a vacuum pump are connected by way of a spool valve to the ducts in the plugs 142 and 144. Movement of the spool from a neutral position thereof to effect selective connection to the ducts in the plugs of the source of air under pressure or the vacuum pump is obtained by actuation of microswitches disposed so as to be operated at selected positions in the path of downward travel of the carriage 3.

Between the surfaces of the male tool element on which are carried the first and second plugs is a flat surface 148 which in the engaged position of the male and female tool elements is slightly spaced from the co-extensive flat portions 110 and 116 of the female element to enable the hinge 52 between the body portion and flip top of the packet to be formed.

In operation of the apparatus, the sheet of hot plastics material issues from the die in the outlet 22 of the extrusion apparatus 6 and then passes between the horizontally disposed rolls 8 and 10 from which it emerges and passes vertically downwardly along the path 12. The rectangular components 26 and 28 of the frame are caused to move downwardly with the carriage 3 at the speed of the sheet and are then moved laterally by their pneumatic rams to clamp therebetween a section of the hot plastics sheet. At this stage the upper part of the clamped section of the sheet becomes subject to local cooling by the parts of the bar groups 70 which contact the sheet. Next, the male tool element means 30, which together with the female tool element means 32 are moving downwardly at the speed of the sheet, are actuated by the associated hydraulic ram on the carriage 3 and moved laterally against the lower part of the clamp section of the sheet which was locally cooled in the preceding cycle of operation. In this movement the second plug 144 on each male tool element displaces the plastics sheet sidewardly through the corresponding aperture 66 of the twenty-four apertures in the lower frame member of the frame component 28 and there is thus formed a generally pyramidal shaped closed cavity in the sheet plastics material over each male tool element 30, the cavity being closed by engagement of the sheet with peripheral forward edges of the male element of the tool. It should be noted that the heating element incorporated in the male tool element heats the tool to a sufficient extent to prevent any appreciable local cooling of the sheet section where it engages the tool element. At this juncture air is withdrawn from the closed cavity through the ducts in each male tool element 30 and this causes the sheet section to be drawn down on to the first and second plugs 142 and 144 and thus to conform closely with the shape of the male tool element. During the evacuation of the cavity the movement of the sheet on to each male tool element is controlled to avoid formation of undesirable folds by reason of the presence in the sheet of the linear locally cooled part disposed parallel with and between the plugs 142 and 144 of the male tool element. The ram on the carriage 3 which effect lateral movement of the female tool element 32 is then actuated to bring the female tool element means 32 into engaged position relative to the male tool element means. It will be noted that by drawing the sheet material into engagement with the male tool element prior to lateral movement of the female tool element, one ensures that a maximum amount of plastics sheet material of substantially uniform thickness enters the cavities in the female tool element.

The next step in the process is the transfer from the male to the female tool elements of the formed parts of the sheet, and this is accomplished by supplying air under pressure to the ducts in the male tool element and at the same time withdrawing air through the ducts of the female tool element. The pressure differential thus created on opposite sides of the formed parts of the sheet causes the latter to be removed from the male tool elements and to conform with the shape of the cavities in the female tool elements. In this part of the process the air under pressure supplied through the male tool element has the effect of causing the plastics of the transferred formed parts to set. It should be noted that during the transfer of the formed parts of the sheet from the male to the female elements, the pair locally cooled rectangular parts of the sheet associated with each male tool element serve to prevent any appreciable thinning of the wall thickness in the region of the corners of the second plug 144 and the wall thickness of the transferred articles is thus of improved uniformity. At this stage of the process the formed packets are detached from the surrounding sheet material by the cutting technique which is described in our co-pending applications Nos. 448,759, now Pat. No. 3,271,816 and 448,595, now Pat. No. 3,267,523, and involves further actuation of the rams controlling lateral movement of the male and female tool element means whereby these element means are urged further one towards the other and as a result mutual flexion takes place between the platens 34 supporting the male and female tool element means which causes the knife edges of each element to pierce the sheet material.

After the cropping of the packets from the surrounding sheet the tool elements 30 and 32 and the frame components 26 and 28 are moved by their associated rams on the carriage 3 to their withdrawn positions. It will be appreciated that by virtue of the undercut in each female tool element each cropped packet is now disposed in its female tool element. To effect ejection of each packet the two complementary parts 92 and 94 of each female tool element are slightly separated by actuation of the vertically disposed ram provided for this purpose and then air is supplied through the passages to the cavities 42 and 44 of each female tool element to blow the formed packets out of the associated female tool elements from which the packets are discharged to a chute 200 (see FIG. 4).

Finally in the process the tool and frame elements on the carriage 3 which during the process have been moving downwards with the sheet are now rapidly returned to an upper part of the machine whereupon, after closure of the parts 92 and 94 by the pneumatic ram associated therewith, the cycle of operation can be repeated. In the succeeding cycle of operation the part of the sheet which in the described cycle was locally cooled is positioned in the lower frame members of the frame components between the male and female tool element means. The sheet plastic from which the packets are removed is driven vertically downwards by further driving rollers in the base of the supporting structure and is then granulated and lifted to the inlet of the extrusion apparatus.

The arrangement and operation of the hydraulic circuit of the apparatus is fully described in our co-pending application No. 448,759, now Pat. No. 3,271,816, and this description is equally applicable to the operation of the apparatus to perform the process of the present invention except, as will be appreciated from the preceding description, there is interpolated at the appropriate times in the cycle of operation described in the said co-pending application, the operations of closing the frame components 26 and 28 on the sheet, of evacuating the closed cavities formed in the sheet by the male tool element, of separating the complementary parts 92 and 94, of opening the frame components 26 and 28 and of closing the parts 92 and 94. All these additional operations in the cycle are initiated by microswitches operated at predetermined locations of the carriage in its vertical travel to effect operation of associated spool valves.

It will be apparent that the invention can be applied to the manufacture of other deep drawn articles and is suitable, for example, for the production of milk bottles.

I claim:

1. The method of simultaneously forming a large number of deep drawn hollow bodies from sheet plastic material which comprises clamping a closed area of heated sheet plastic material between a first frame component which engages the closed area only at its periphery and a second frame component having an array of apertures, moving similar male tools relative to the clamped area of sheet so that each male tool displaces a discrete section of the clamped area of sheet through a corresponding one of the apertures in the second frame component, thereby causing a discrete section of the clamped area of sheet to flow over each male tool to form a closed cavity individual to each male tool and between each male tool and the sheet, said closed cavity having a depth equal to that of the corresponding male tool, applying suction through each male tool to evacuate the cavity formed in the associated discrete section of the sheet and causing said discrete section of the sheet to move into engagement with the corresponding male tool, effecting relative movement between the male and corresponding female tools to engage the male tools in the female tools, and applying a pressure differential to opposite sides of each drawn discrete section of the sheet to transfer said section from the male to the corresponding female tool and causing the section to conform to the shape of the female tool.

2. The method claimed in claim 1 characterized by performing the forming operations on successive sections of the sheet plastics material.

3. The method claimed in claim 2, characterized by performing the forming operations on a continuously moving sheet.

4. The method claimed in claim 3, characterized by performing the forming operations on a continuously extruding sheet.

5. The method of simultaneously forming a large number of deep drawn hollow bodies from sheet plastics material which comprises, in combination, a cooling operation and a forming operation, and which includes simultaneously clamping two successive contiguous areas of heated sheet plastics material, and effecting a forming operation on one of said areas whilst simultaneously effecting a cooling operation on the other area, on which area the next successive forming operation is to be effected immediately after the said simultaneous forming and cooling operations, the said area of sheet on which the forming operation is to be effected being clamped between a first frame component which engages the closed area only at its periphery and a second frame component having an array of apertures, the forming operation comprising moving similar male tools relative to the clamped area of sheet so that each male tool displaces a discrete section of the clamped area of sheet through one of the apertures in the second frame component, thereby causing a discrete section of the clamped area of sheet to flow over each male tool to form a closed cavity individual to each male tool and between each male tool and the sheet, said closed cavity having a depth equal to that of the corresponding male tool, applying suction through each male tool to evacuate the cavity formed in the associated discrete section of the sheet and causing said discrete section of the sheet to move into engagement with the corresponding male tool, effecting relative movement between the male and the corresponding female tools to engage the male tools in the female tools, and applying a pressure differential to opposite sides of each drawn discrete section of the sheet to transfer said section from the male to the corresponding female tool and causing the section to conform to the shape of the female tool, and the cooling operation comprising cooling selected portions of sections of the clamped area of sheet plastics material, which cooled portions act to control the distribution of sheet plastics material in the section, during the steps of forming a closed cavity in the section, drawing the section into engagement with the side portions of the male tool, and transferring the section to the female tool, so that hollow bodies of substantially uniform wall thickness are formed.

6. Apparaus for simulaneously forming a large number of deep drawn hollow bodies from sheet plastic material comprising first and second frame components adapted to clamp between them a closed area of heated sheet plastics material, the first frame component being adapted to engage the closed area only at its periphery, and the second frame component having an array of apertures, a large number of similar male tools disposed on the side of the frame components nearer the first component, each male tool corresponding to one of the apertures in the second frame component, and a corresponding number of female tools disposed on the opposite side of the frame components, transport means for moving the male tools relatively to the frame components so that, in use, each male tool displaces a discrete section of the clamped closed area through the corresponding aperture in the second frame component to form a cavity in the drawn discrete section of depth equal to that of said male tool, duct means in the male tool and suction means acting through the duct means for drawing the discrete sections of the closed area heated plastics material clamped to the frame into engagement with the respective male tools, further transport means for moving the female tools relatively to the male tools and the frame components to a position in which each male tool is disposed within the corresponding female tool, duct means in the female tool and air pressure varying means for applying differential air pressure to the discrete section of the sheet engaged on each of the male tools to transfer the sheet section to corresponding female tool thereby causing the sheet of the sheet section to conform to that of the corresponding female tool.

7. Apparatus as claimed in claim 6, further characterized in that said second frame component is formed as a lattice defining said array of apertures.

8. Apparatus as claimed in claim 6, characterized in that there are provided means for continuously moving a sheet of plastics material and means for moving during forming operations on a section of the sheet the male and female tools and the frame components parallel to the path of the sheet and in the direction of movement of the sheet at a speed equal to the speed of movement of the sheet.

9. Apparatus as claimed in claim 8, characterized in that there are provided means for returning, after each set of forming operations on the sheet, the male and female tools and the frame components to a position at which a next set of forming operations can be begun on a further section of the sheet.

10. Apparatus as claimed in claim 8, characterized in that there is provided an extruder which, in operation continuously extrudes heated sheet plastics material into an upright path through the apparatus between the male and the female tools.

11. Apparatus as claimed in claim 6 and adapted for forming from sheet plastics material containers each having a hollow body and a hinged top closure for the body, characterized in that the or each female tool is formed with two cavities extending inwardly from the mount of the female tool and defining the shape of the body and the top closure respectively of the container, the part of the female tool between the cavities defining a hinge for the container, and the or each male tool is formed with two projecting plugs adapted to engage in the cavities in the or each female tool.

12. Apparatus as claimed in claim 11 characterized in that the cavity in the or each female tool defining the body of the container is so adapted that the body has an undercut or rebated part, the female tool is formed in two parts and means are provided for separating the two parts and supplying air under pressure to the female tool to eject the formed container from the female tool.

13. Apparatus for simultaneously forming a large number of deep drawn hollow bodies from sheet plastic material comprising first and second frame components adapted to clamp between them a closed area of heated sheet plastics material, the first frame component being adapted to engage the closed area only at its periphery, and the second frame component having an array of apertures, a large number of similar male tools disposed on the side of the frame components nearer the first component, each male tool corresponding to one of the apertures in the second frame component, and a corresponding number of female tools disposed on the opposite side of the frame components, transport means for moving the male tools relatively to the frame components so that, in use, each male tool displaces a discrete section of the clamped closed area through the corresponding aperture in the second frame component to form a cavity in the drawn discrete section of depth equal to that of said male tool, duct means in the male tool and suction means acting through the duct means for drawing the discrete sections of the closed area of heated plastics material clamped to the frame into engagement with the respective male tools, further transport means for moving the female tools relatively to the male tools and the frame components to a position in which each male tool is disposed within the corresponding female tool, duct means in the female tool and air pressure varying means for applying differential air pressure to the discrete section of the sheet engaged on each of the male tools to transfer the sheet section to corresponding female tool thereby causing the sheet of the sheet section to conform to that of the corresponding female tool, wherein each frame component comprises a first frame part within the boundary of which the forming operations are carried out, and a second frame part adjacent the first frame part and provided with cooling means for cooling, whilst first forming operations are carried out on discrete sections of the first closed area of sheet located between the first frame parts, selected portions of a second area of sheet adjacent the said first closed area, the cooling means comprising pads mounted on the first frame parts, each pad on one frame part being disposed in face to face relationship with a pad on the other frame part, the pads engaging and thereby locally cooling the second area of sheet when the sheet is clamped between the frame components, and there are provided means for effecting relative movement between the sheet and the frame components immediately after the first forming operation to a position in which the said second area is so located between the first frame parts that a forming operation can be carried out on discrete sections of the second area of sheet, during which forming operation the cooled portions of each discrete section of the second area act to control the distribution of sheet plastics material in the section.

References Cited

UNITED STATES PATENTS

| | | | |
|---|---|---|---|
| 3,256,564 | 6/1966 | Welshon | 264—92 X |
| 3,342,914 | 9/1967 | Edwards | 264—89 |
| 2,973,558 | 3/1961 | Stratton | 264—89 |
| 3,291,874 | 12/1966 | Negoro | 264—89 |

ROBERT F. WHITE, Primary Examiner

J. H. SILBAUGH, Assistant Examiner

U.S. Cl. X.R.

18—19; 264—90, 99